Feb. 2, 1926.
P. BARDUCCI
1,571,228
DRYING PLANT
Filed Feb. 20, 1922   2 Sheets-Sheet 1
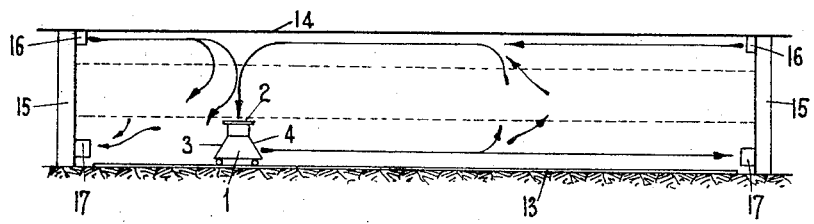
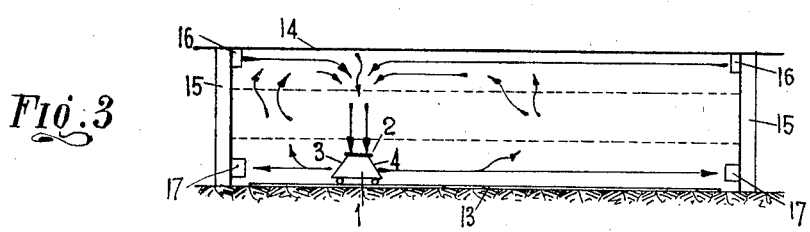
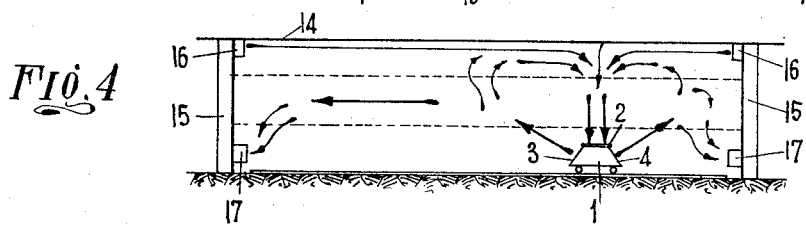
Inventor:
P Barducci
By Lawrence Langner
   Attorney Feb. 2, 1926. 1,571,228
P. BARDUCCI
DRYING PLANT
Filed Feb. 20, 1922 2 Sheets-Sheet 2

Inventor
P. Barducci
By Lawrence Langner
Attorney

Patented Feb. 2, 1926.

1,571,228

UNITED STATES PATENT OFFICE.

PILADE BARDUCCI, OF MILAN, ITALY.

DRYING PLANT.

Application filed February 20, 1922. Serial No. 538,037.

*To all whom it may concern:*

Be it known that I, PILADE BARDUCCI, a subject of the King of Italy, and resident of Milan, Italy, have invented certain new and useful Improvements in Drying Plants, of which the following is a specification.

The present invention relates to drying plants and has for its object a drying room which comprises means travelling along the same and producing a vertical air current above them and other currents at an angle to the first one which are directed along the path of said means, stationary means being provided at the ends of the room, which produce air currents meeting those produced by said travelling means and combining therewith.

According to this invention is obtained an even operation of the plants comprising travelling ventilating means, because the air circulation produced by the stationary means acts to control the direction and intensity of the streams produced in the room.

Further said end stationary ventilating means act to exhaust a portion of the air from the room and introduce in the same fresh air, and they may also be provided with means for heating or cooling or, generally speaking, treating air flowing through them.

Figure 2:
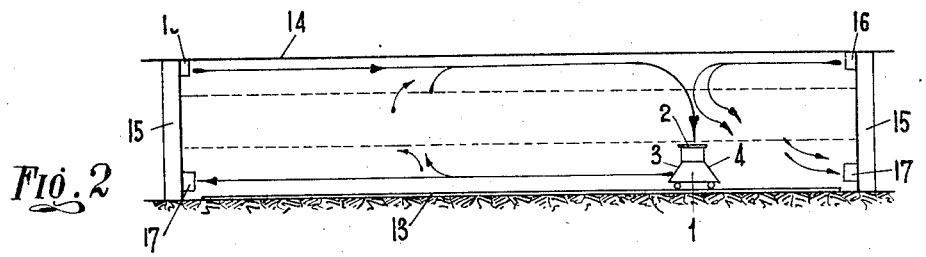
Figure 5:
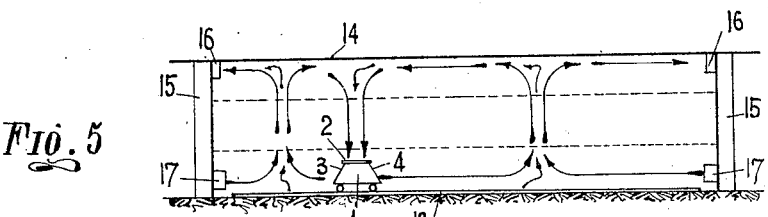
Figure 6:
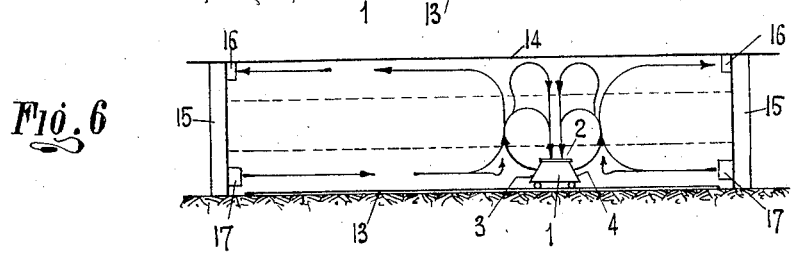
Figure 7:
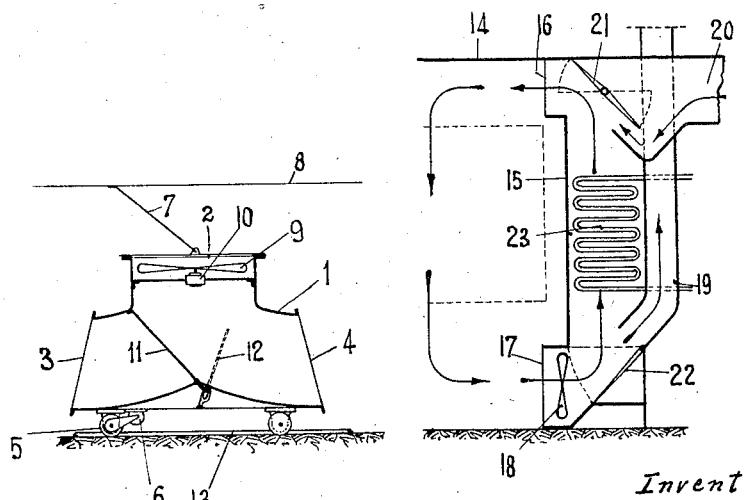

The annexed drawings show diagrammatically the operation of the plant in different conditions of operation, and the paths of the ventilating streams which may be obtained according to this invention. In said drawings: Figure 1 is the longitudinal vertical section of a drying chamber with the reciprocating ventilating apparatus in a given position; Figure 2 is a section similar to Figure 1 with the reciprocating ventilating apparatus in a different position; Figure 3 is a view similar to Figures 1 and 2 with the reciprocating ventilating apparatus in a modified condition of operation; Figure 4 is a view similar to Figure 3 with the reciprocating ventilating apparatus in a further different operating condition; Figures 5 and 6 show other diagrams of ventilation which may be produced by the arrangement according to this invention; Figure 7 is a fragmentary section of the room to an enlarged scale showing in detail the construction of the end stationary ventilating apparatus and of the travelling apparatus.

According to this invention in the ventilating or drying room is located a ventilating apparatus which is adapted to reciprocate throughout the room, which is assumed to have elongated shape, and the operation of said reciprocating ventilating means is combined with stationary ventilating means located at both the ends of the room 14 as hereinafter fully described.

As shown particularly by Figure 7, the reciprocating apparatus comprises a casing 1 having a top mouth 2 and two side mouths 3 and 4, and provided with means for its reciprocation as wheels 5 running on rails 13 and an electro-motor 6 whose circuit is fed by a trolley 7 and a line 8 suspended in the room.

Said casing 1 comprises an air propeller 9 driven by an electromotor 10 and a partition 11 operated by a lever 12 arranged outside of the casing, for controlling the communication of the top mouth 2 with the mouths 3 and 4; by this arrangement said mouth 2 may be put in communication with either or both the side mouths 3 and 4.

It is to be understood that this embodiment of ventilating apparatus is shown and described merely for purpose of illustration but the present invention is not restricted to the particular construction described and illustrated, it being only confined by the appended claims.

It is also to be held in mind that many features are not claimed per se in this application, they being described and claimed in my U. S. Patent Nos. 1,381,054 and 1,546,-464 to which attention is called.

At each of the ends of the room is provided a chamber or casing 15 which has a top mouth 16 and a bottom mouth 17 and comprises a reversible air propeller 18 (see Figure 11). To said chamber lead ducts 19 and 20 each of which opens in register with one of said mouths 16 and 17 and said ducts are provided with valves 21—22 for controlling the flow of air through each of them and the casing mouth in front of the same.

Finally in said casing 15 are provided, if desired, means for heating, cooling, or treating the air, which are shown conventionally by a coil 23.

The air propellers 9 and 18 are intended to cooperate with each other as hereinafter fully described, and the propeller 9 acts to put the air in circulation within the room, while the propeller 18 produces air currents in the room which cooperate with those produced by the travelling one to improve the ventilation and produce well defined air streams through the room.

Further the said propeller 18 produces a circulation of air through the chamber or casing 15 and causes the exhaust to the outside of a portion of the air flowing through this casing and a supply of fresh air from the outside into the casing and room.

By adjusting the delivery of each of the propellers 9 anad 18 with respect to the other one, the amount of air propelled by the propeller 17 may be made equal to or less or larger than that moved by the propeller 9 through the mouth 3 or 4 facing the mouths 16 and 17 of the casing 15, for the purpose of modifying the rate of circulation of the air within the room.

In the several figures the material to be dried is assumed to be located in the space enclosed between the horizontal dotted lines above the travelling casing 1.

Figures 1 and 2 show diagrammatically the flow of air through the room, being assumed that the single mouth 4 is open and that the amount of air introduced into the room through each of the mouths 16 is less than the volume of air conveyed by the propeller 9 of the carriage 1.

Under these circumstances it is obtained that the air circulates as shown by the arrows, that is the most of the air introduced through the mouth 16 of the casing 15 facing the closed mouth 3 of the carriage 1 is exhausted through the mouth 17 of the same casing; on the contrary the most of the air introduced through the mouth 16 of the other chamber 15 is sucked by the propeller 9 of the carriage 1 and a portion of the air issuing through the mouth 4 of the carriage is exhausted through the mouth 17 of the same casing 15, while a strong vertical current is produced above the carriage 1 and a return vertical current is also produced at a distance from the carriage 1 by the air propelled through the mouth 4 and drawn through the mouth 2 by the propeller 9, because the volume of air moved by this propeller is larger than that conveyed by the propeller 18 of the chamber 15; the two vertical currents above referred to move with the carriage 1 during its reciprocation and the return vertical current is at any time at a given distance from it, at the side towards which is open the side mouth of the carriage casing 1 (as 4 in Figure 1).

The volume of air which circulates through the chamber or casing 15 is wholly or partly exhausted and substituted by fresh one; this latter may be heated or cooled by the coil 23.

Further owing to the action exerted by the air streams produced through the mouths 16 and 17 by the propeller 18 in the room, it is obtained that the currents promoted by the propeller 9 take place at any time along well defined paths.

Figure 3 shows a similar arrangement in which it is assumed that both the front mouths 3-4 of the ventilating carriage 1 are open; then there are obtained two vertical currents each at one of the sides (leading and trailing ones) of the ventilating carriage 1; each of these currents coacts with the current promoted through the casing 15 which is in front of it, in the same manner as described in connection with Figures 1 and 2.

Figure 4 shows the current produced in a room by an arrangement of the above described kind, assuming to use a ventilating carriage 1 having inclined side mouths 3-4; in this case is produced a vertical current above the carriage and two inclined currents adjacent to it, as well as a longitudinal air current, or two of such currents, directed towards the mouth or mouths 17; the two side ventilating currents are not produced when the volume of air drawn through the mouths 17 is equal to or larger than that conveyed by the propeller 9.

The conditions of operation shown by Figure 1 are the most frequently used in practice, but when for the purpose of drying some particular materials it is required to produce strong downward currents, it suffices to reverse the operation of the propellers 18 to produce horizontal currents departing from the mouths 16 and meeting the currents produced by the ventilating carriage 1, as shown by Figures 5 and 6.

More particularly in the case shown by Figure 5 the horizontal currents produced by the ventilating carriage 1 meet the horizontal currents produced by the propellers 18 through the mouths 17, and they produce upward currents each of which divides in two near the top wall of the room; one of the divided currents supplies air to the ventilating carriage 1, while the other one is directed towards the suction mouth 16 of the opposite casing 15.

In the case of Figure 6 the air currents produced by the ventilating carriage 1 close on themselves within a restricted space above the ventilating casing 1; in said space meet also the currents produced by the propellers 18, this giving rise to an eddy which moves through the room in unison with the ventilating carriage 1. From this eddy, near the top mouth of the carriage casing, depart currents directed towards the mouths 16 of the casings 15, the volume of air in agitation being larger than that which may be conveyed by the air propelling means of the carriage 1.

In the above described cases it is assumed that the room has such a length as the return current or currents which arise at a given distance or distances from the travelling ventilating carriage may actually move with it; then they produce an even ventilation of the material to be dried, as this ventilation is made by a current which acts alternately in opposite directions on the material.

By the arrangement according to this invention a large volume of air is circulated through the casing 15 and the operation of the propelling means of this casing may be caused to cooperate in such a manner with that of the carriage as to make very even the conditions as to dryness and temperature of the air streams passing through the material, while doing away with any cumbersome apparatus located within the room and intended to heat and change the air.

Further very different drying or ventilating methods can be carried into practice by causing the space occupied by the material to be passed through by a vertical current above the ventilating carriage, and by other currents opposite to the first one which may be more or less strong; further in the drying room may be produced a single vertical current above the carriage as required for obtaining alternate ventilation of the material in comparatively short rooms.

Finally by the means arranged in the casing 15 the same ambient air of the room may be circulated or an amount of fresh air may be introduced into the room, and a portion of the air driven out from the room may be exhausted.

It is to be understood that the constructions illustrated are given merely by way of example and that many changes may be made therein; within the scope of the annexed claims.

What I claim as my invention and desire to secure by United States Letters Patent is:—

1. In a plant for drying materials, a room intended to contain the material to be dried, means reciprocating in said room and adapted to produce vertical air currents and air streams directed along the path of said means, and means at both ends of said room producing therein air currents directed towards and from said reciprocating means, respectively.

2. In a plant for drying materials, a room intended to contain the material to be dried, means reciprocating in said room and adapted to produce vertical air currents and air streams directed along the path of said means, said means comprising suction and exhaust mouths and means at the ends of said room producing therein air currents directed towards said suction mouth and air currents coming from said exhaust mouth.

3. In a plant for drying materials, a room intended to contain the material to be dried, means reciprocating in said room and adapted to produce vertical air currents and air streams directed along the path of said means, said means comprising suction and exhaust mouths, and means at the ends of said room producing therein air currents directed against said exhaust mouth and air currents in a direction departing from said suction mouth.

4. In a plant for drying materials, a room intended to contain the material to be dried, means reciprocating in said room and adapted to produce vertical air currents and air streams directed along the path of said means, a casing at each end of said arm having mouths opening in said room, air propelling means in said casing intermediate said mouths, a port for discharging an amount of air from said casing, a port for supplying an amount of air into said casing, and means for adjusting the air flow through said ports.

5. In a plant for drying materials, a room intended to contain the material to be dried, means reciprocating in said room and adapted to produce vertical air currents and air streams directed along the path of said means, a casing at each end of said arm having mouths opening in said room, air propelling means in said casing intermediate said mouths, a port for discharging an amount of air from said casing, a port for admitting an amount of air into said casing, means for adjusting the air flow through said ports, and heat exchanging means in said casing.

6. In a plant for drying materials, a room intended to contain the material to be dried, means reciprocating in said room and adapted to produce vertical air currents and air streams directed along the path of said means, a casing at each end of said arm having mouths opening in said room, air propelling means in said casing intermediate said mouths, a port for discharging an amount of air from said casing, a port for admitting an amount of air into said casing, means for adjusting the flow of the air through said ports and heat exchanging means in said casing, these means being intermediate said exhaust and inlet ports of said casing.

Signed at Milan, Italy, this 6th day of February 1922.

PILADE BARDUCCI.